United States Patent
Han (10) Patent No.: US 11,140,760 B2
(45) Date of Patent: Oct. 5, 2021

(54) DC-DC CONVERTER AND LIGHT SOURCE DRIVING DEVICE COMPRISING SAME

(71) Applicant: LG INNOTEK CO., LTD., Seoul (KR)

(72) Inventor: Jae Hyun Han, Seoul (KR)

(73) Assignee: LG INNOTEKCO., LTD., Seoul (KR)

( * ) Notice: Subject to any disclaimer, the term of this patent is extended or adjusted under 35 U.S.C. 154(b) by 0 days.

(21) Appl. No.: 17/261,645

(22) PCT Filed: Jul. 25, 2019

(86) PCT No.: PCT/KR2019/009294
§ 371 (c)(1),
(2) Date: Jan. 20, 2021

(87) PCT Pub. No.: WO2020/027502
PCT Pub. Date: Feb. 6, 2020

(65) Prior Publication Data
US 2021/0267035 A1    Aug. 26, 2021

(30) Foreign Application Priority Data

Jul. 30, 2018  (KR) .......................... 10-2018-0088260

(51) Int. Cl.
*H05B 45/375*    (2020.01)
*H05B 45/44*    (2020.01)
(Continued)

(52) U.S. Cl.
CPC ......... *H05B 45/375* (2020.01); *H05B 45/325* (2020.01); *H05B 45/38* (2020.01); *H05B 45/44* (2020.01)

(58) Field of Classification Search
CPC .... H05B 45/375; H05B 45/38; H05B 45/325; H05B 45/44
See application file for complete search history.

(56) References Cited

U.S. PATENT DOCUMENTS 6,873,111 B2 * 3/2005 Ito ...................... H05B 45/3725
                                                           315/82
7,863,845 B2   1/2011 Kasai et al.
(Continued)

FOREIGN PATENT DOCUMENTS

JP    2007-015474    1/2007
JP    2007-189004    7/2007
(Continued)

OTHER PUBLICATIONS

International Search Report dated Nov. 11, 2019 issued in Application No. PCT/KR2019/009294.

*Primary Examiner* — Borna Alaeddini
(74) *Attorney, Agent, or Firm* — Ked & Associates, LLP (57) ABSTRACT

A DC-DC converter according to an embodiment comprises: a first converter unit for generating a first output voltage by adjusting a level of an input voltage according to a pulse control signal applied to a first switch element; a first light emitting unit disposed at an output end of the first converter unit; a second converter unit, connected to the output end of the first converter unit, for generating a second output voltage by adjusting a level of the input voltage or the first output voltage according to a pulse control signal applied to a second switch element; a second light emitting unit disposed at an output end of the second converter unit; and a control unit for generating pulse control signals to be applied to the first switch element and the second switch element separately according to driving modes of the first and second light emitting units, and for controlling switching operations of the first and second switch elements according to the generated pulse control signals.

14 Claims, 5 Drawing Sheets

(51) Int. Cl.
  *H05B 45/38*   (2020.01)
  *H05B 45/325*  (2020.01)

(56) References Cited

U.S. PATENT DOCUMENTS

| | | | |
|---|---|---|---|
| 9,643,509 | B2 | 5/2017 | Bang |
| 9,730,289 | B1* | 8/2017 | Hu ....................... H05B 45/395 |
| 10,045,407 | B1* | 8/2018 | Theunissen .......... H05B 45/395 |
| 2003/0169022 | A1* | 9/2003 | Turner .................... H02J 7/345 |
| | | | 320/166 |
| 2008/0265670 | A1 | 10/2008 | Pansier |
| 2013/0320850 | A1* | 12/2013 | Nakamura ............. H05B 47/24 |
| | | | 315/82 |
| 2015/0022102 | A1* | 1/2015 | Holmes .................. H05B 45/14 |
| | | | 315/191 |
| 2017/0231045 | A1* | 8/2017 | Hu ......................... H05B 45/38 |
| 2020/0350827 | A1* | 11/2020 | Ahmed ............. H02M 3/33576 |

FOREIGN PATENT DOCUMENTS

| | | |
|---|---|---|
| JP | 2010-140675 | 6/2010 |
| JP | 2015-106439 | 6/2015 |
| KR | 10-2003-0018873 | 3/2003 |
| KR | 10-1592650 | 2/2016 |
| KR | 10-2016-0095773 | 8/2016 |
| WO | WO 2006/013500 | 2/2006 |

\* cited by examiner

DC-DC CONVERTER AND LIGHT SOURCE DRIVING DEVICE COMPRISING SAME

CROSS-REFERENCE TO RELATED PATENT APPLICATIONS

This application is a U.S. National Stage Application under 35 U.S.C. § 371 of PCT Application No. PCT/KR2019/009294, filed Jul. 25, 2019, which claims priority to Korean Patent Application No. 10-2018-0088260, filed Jul. 30, 2018, whose entire disclosures are hereby incorporated by reference.

TECHNICAL FIELD

An embodiment relates to a DC-DC converter and a light source driving device including the same.

BACKGROUND ART

Light-emitting diodes (LEDs) are widely used as light sources. In particular, light emitting diodes are emerging as a promising market in the vehicle and lighting industry. Since light-emitting diodes can be used semi-permanently and realize high luminance and high power, they have been actively developed as light sources for vehicles in recent years.

In order to use alight emitting diode as alight source for a vehicle, the light emitting diode must emit light with a certain luminance. At this time, a constant current circuit designed in the form of an integrated circuit (IC) is provided in order for the light emitting diode to emit light with a constant brightness.

In addition, in recent years, as the electronic equipment of vehicles is intensified and emission regulations in each country become strict, the 48V electric system is drawing attention. This is because it can contribute to improving fuel efficiency and meet the increasing demand for electric power inside the vehicle. Here, the 48V means a voltage inside the vehicle. In other words, it means using a voltage that is about four times higher than the 12V voltage that most conventional electronic devices use.

Therefore, even if the same power is supplied, the current is inversely proportional to the magnitude of the voltage. Accordingly, when the voltage inside the vehicle is increased from 12V to 48V, the magnitude of the current under the condition of generating the same power decreases to ¼. In addition, a thickness of the wire becomes thinner as the current decreases, which can reduce the weight of vehicle electronic components and at the same time reduce power loss due to the decrease in current, thereby increasing the efficiency of the electronic device.

Meanwhile, a light-emitting diode used for a vehicle or for lighting is composed of a multi-channel structure in which a plurality of arrays are connected in parallel with each other. Accordingly, an additional IC type element must be provided for individual control of the multi-channel light-emitting diodes.

As described above, in order to individually control the multi-channel light emitting diode, there is a problem that the number of channels and necessary components of the driving circuit increases, and thus the occupied area of the driving circuit increases, thereby complicating driving.

In addition, a method of driving a light emitting diode applied to a vehicle using a bidirectional power of 12V or 48V is extremely limited, and accordingly, in a battery hybrid method in which a 48V battery system is combined with a 12V system, a method capable of efficiently driving the light emitting diode is required.

DISCLOSURE

Technical Problem

In an embodiment of the present invention, a DC-DC converter capable of stably driving light-emitting diodes requiring different voltages and a light source driving device including the same are provided.

In addition, in an embodiment of the present invention, a DC-DC converter in which a buck-type converter and a boost-type converter are integrated into one, and a light source driving device including the same are provided.

In addition, in an embodiment of the present invention, a DC-DC converter capable of stably driving a load having a high input voltage and a low forward voltage by using a floating ground, and a light source driving device including the same.

The technical problems to be achieved in the proposed embodiment are not limited to the technical problems mentioned above, and other technical problems not mentioned may be clearly understood by those of ordinary skill in the art to which the proposed embodiment belongs from the following description.

Technical Solution

The DC-DC converter according to the embodiment includes: a first converter configured to output a first output voltage by adjusting a level of an input voltage according to a pulse control signal applied to a first switch element; a first light emitter disposed at an output terminal of the first converter; a second converter connected to the output terminal of the first converter and configured to generate a second output voltage by adjusting a level of the input voltage or the first output voltage according to a pulse control signal applied to a second switch element; a second light emitter disposed at an output terminal of the second converter; and a controller configured to generate pulse control signals to be applied to the first and second switch elements according to a driving mode of the first and second light emitters and configured to control a switching operation of the first and second switches according to the generated pulse control signals, wherein the first output voltage is greater than the input voltage, and the second output voltage is smaller than the first output voltage and the input voltage.

Further, it further includes a third switching element disposed between an input terminal of the first converter to which the input voltage is applied and an output terminal of the second light emitter.

In addition, the first converter includes a first inductor including one terminal to which the input voltage is applied, the first switch element having a first terminal connected to the other terminal of the first inductor, a second terminal connected to the output terminal of the first light emitter, and a third terminal connected to the controller, a first diode having an anode terminal connected to the other terminal of the inductor and the first terminal of the first switch element, and a first capacitor having one terminal connected to a cathode terminal of the first diode.

In addition, the second converter includes the second switch element having a first terminal connected to the cathode terminal of the first diode and the one terminal of the first capacitor, and a third terminal connected to the controller, a second diode having a cathode terminal connected to a second terminal of the second switch element and an anode terminal connected to the other terminal of the first capacitor, a second inductor having one terminal connected to a cathode terminal of the second diode and the second terminal of the second switch element, and a second capacitor having one terminal connected to the other terminal of the second inductor and other terminal connected to the anode terminal of the second diode.

In addition, the driving mode includes a first driving mode in which both the first and second light emitters are turned on; a second driving mode in which the first light emitter is turned on and the second light emitter is turned off, and a third driving mode in which the first light emitter is turned off and the second light emitter is turned on.

In addition, the third switch element operates in a turn-on state and a turn-off state according to a period of the first driving mode, and maintains a turn-off state in the second and third driving modes.

Meanwhile, the light source driving device according to the embodiment includes: a battery part including a first battery supplying a first input voltage and a second battery supplying a second input voltage smaller than the first input voltage; a DC-DC converter configured to receive any one of the first and second input voltages from the battery part, output a first output voltage to the first light emitter based on the input voltage according to a driving mode, and output a second output voltage to a second light emitter based on any one of the first output voltage and the input voltage; and a switch disposed between the battery part and the DC-DC converter and connecting between the DC-DC converter and any one of the first and second batteries, wherein the DC-DC converter comprises: a boost converter disposed between the battery part and the first light emitter and configured to boost the applied input voltage according to a switching operation of a first switch element to output the first output voltage; and a buck converter disposed between an output terminal of the boost converter and the second light emitter, output the second output voltage by stepping down the applied input voltage or the first output voltage output through the boost converter according to a switching operation of a second switch element.

In addition, the first output voltage is greater than the first and second input voltages, and the second output voltage is less than the first output voltage, the first input voltage, and the second input voltage.

In addition, it further includes a third switching element disposed between an input terminal of the boost converter and an output terminal of the second light emitter, and configured to selectively perform a turn-on operation according to the driving mode to connect the output terminal of the second light emitter to the input terminal of the boost converter.

In addition, the boost converter includes a first inductor having one terminal connected to the switch to which the first or second input voltage is applied, the first switch element having a first terminal connected to the other terminal of the first inductor, a second terminal connected to an output terminal of the first light emitter, and a third terminal connected to a controller, a first diode having an anode terminal connected to the other terminal of the inductor and the first terminal of the first switch element, and a first capacitor having one terminal connected to a cathode terminal of the first diode, and the buck converter includes the second switch element having a first terminal connected to the cathode terminal of the first diode and one terminal of the first capacitor, and a third terminal connected to the controller, a second diode having a cathode terminal connected to a second terminal of the second switch element and an anode terminal connected to the other terminal of the first capacitor, a second inductor having one terminal connected to the cathode terminal of the second diode and the second terminal of the second switch element.

In addition, the driving mode includes a first driving mode in which both the first and second light emitters are turned on; a second driving mode in which the first light emitter is turned on and the second light emitter is turned off, and a third driving mode in which the first light emitter is turned off and the second light emitter is turned on, and wherein the third switch element operates in a turn-on state and a turn-off state according to a period of the first driving mode, and maintains a turn-off state in the second and third driving modes.

In addition, the switch is configured to connect the first battery and the DC-DC converter in the first and second driving modes, and to connect the second battery and the DC-DC converter in the third driving mode.

Advantageous Effects

According to an embodiment of the present invention, it is possible to provide an integrated DC-DC converter capable of driving a plurality of loads, respectively, under load conditions requiring different voltages. That is, the DC-DC converter includes a first converter connected to a power input part, a first load disposed at an output terminal of the first converter, a second converter disposed at an output terminal of the first converter, and a second load disposed at an output terminal of the second converter. In the present invention, as described above, a plurality of converters are integrated into one, thereby stably driving a plurality of loads requiring different voltages. Accordingly, in the present invention, a space in which the converter is disposed can be minimized by integrating a plurality of converters into one. In addition, in the present invention, by sharing at least a part of the first and second converters with each other, it is possible to drastically reduce necessary components, thereby reducing product cost.

In addition, an embodiment according to the present invention provides a DC-DC converter that is connected to a 48V battery and a 12V battery and stably provides a driving voltage to each load according to an input voltage. Furthermore, in the present invention, a battery to provide the input voltage is selected according to a load to be driven among a plurality of loads. That is, the DC-DC converter in the present invention can be applied to both a two-way battery system including both 12V and 48V batteries, or a separate battery system including only one of them. Accordingly, in the present invention, power conversion efficiency can be increased by selecting a battery to provide the input voltage from among the plurality of batteries according to a load condition, thereby increasing the efficiency of an electronic device.

In addition, in the present invention, by using a floating ground, a load having a high input voltage and a low forward voltage can be stably driven. In addition, in the present invention, by controlling the switching element based on a high duty ratio, it is possible to increase the stability of the driving circuit and increase the efficiency at the same time. In addition, in the present invention, it is possible to minimize output noise by using the L-C output filter, and accordingly, the L-C filter in a load requiring a high voltage can be reinforced.

BEST MODE

Hereinafter, exemplary embodiments disclosed in the present specification will be described in detail with reference to the accompanying drawings, but identical or similar elements are denoted by the same reference numerals regardless of reference numerals, and redundant descriptions thereof will be omitted. The suffixes "module" and "part" for components used in the following description are given or used interchangeably in consideration of only the ease of preparation of the specification, and do not themselves have a distinct meaning or role. In addition, in describing the embodiments disclosed in the present specification, when it is determined that a detailed description of related known technologies may obscure the subject matter of the embodiments disclosed in the present specification, the detailed description thereof will be omitted. In addition, the accompanying drawings are for easy understanding of the embodiments disclosed in the present specification, and the technical idea disclosed in the present specification is not limited by the accompanying drawings, and all modifications included in the spirit and scope of the present invention It should be understood to include equivalents or substitutes.

Terms including an ordinal number such as first and second may be used to describe various elements, but the elements are not limited by the terms. These terms are used only for the purpose of distinguishing one component from another component.

When a component is referred to as being "connected" or "connected" to another component, it is understood that it may be directly connected or connected to the other component, but other components may exist in the middle. Should be. On the other hand, when a component is referred to as being "directly connected" or "directly connected" to another component, it should be understood that there is no other component in the middle.

Singular expressions include plural expressions unless the context clearly indicates otherwise.

In this application, terms such as "comprises" or "have" are intended to designate the presence of features, numbers, steps, actions, components, parts, or combinations thereof described in the specification, but one or more other features. It is to be understood that the presence or addition of elements or numbers, steps, actions, components, parts, or combinations thereof, does not preclude in advance the possibility.

Figure 1A:
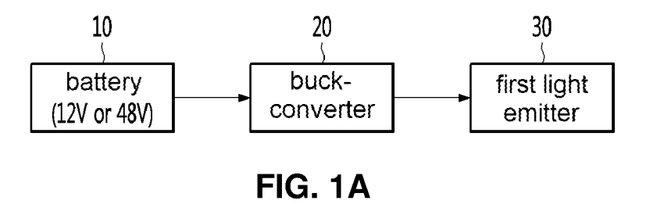
FIGS. 1A and 1B are diagrams illustrating a light source driving device according to a comparative example.
Figure 1B:
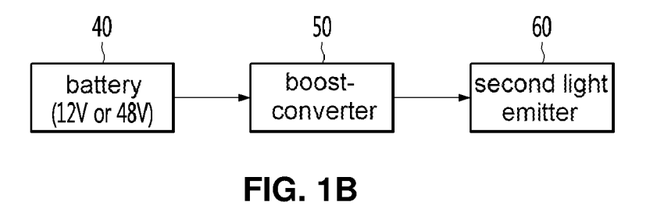

FIG. 1 is a diagram illustrating a light source driving device according to a comparative example.

Referring to FIG. 1, the light source driving device according to the comparative example may be configured as a first type converter as shown in (a) or a second type converter as shown in (b) according to the sizes of input power and output power.

For example, the first type of converter may be a buck type of converter, and the second type of converter may be a boost type of converter.

Referring to (a) of FIG. 1, the light source driving device includes a battery 10, a buck-converter 20, and a first light emitter 30.

In addition, referring to (b) of FIG. 1, the light source driving device includes a battery 40, a boost converter 50, and a second light emitter 60.

The batteries 10 and 40 may be a 12V battery providing a voltage of 12V, or a 48V battery providing a voltage of 48V.

In addition, the first light emitter 30 may be a load requiring a voltage lower than the voltage provided by the batteries 10 and 40. For example, the first light emitter 30 may be a load requiring a driving voltage of 3V.

In addition, the second light emitter 60 may be a load that requires a voltage higher than the voltage provided by the batteries 10 and 40. For example, the second light emitter 60 may be a load requiring a driving voltage of 60V.

Meanwhile, in recent years, a battery hybrid method that combines a 12V battery system with a 48V battery system has been developed or devised.

However, the conventional light source driving apparatus as described above is designed to receive an input voltage only from one of a 12V battery and a 48V battery, thereby, in the hybrid method, the operation may be limited, and accordingly, there is a problem in that the light emitting device cannot be stably driven.

In addition, as described above, the first load and the second load require different conditions, accordingly, a driving voltage is supplied to the first load through a buck converter, and a driving voltage is supplied to the second load through a boost converter.

Accordingly, according to the comparative example, in order to supply driving voltages to the first and second loads, respectively, a buck converter and a boost converter that are separated from each other are required. In addition, in the comparative example, the space occupied by the product is increased due to the separate arrangement of the buck converter and the boost converter, thereby increasing the product volume.

Figure 2:
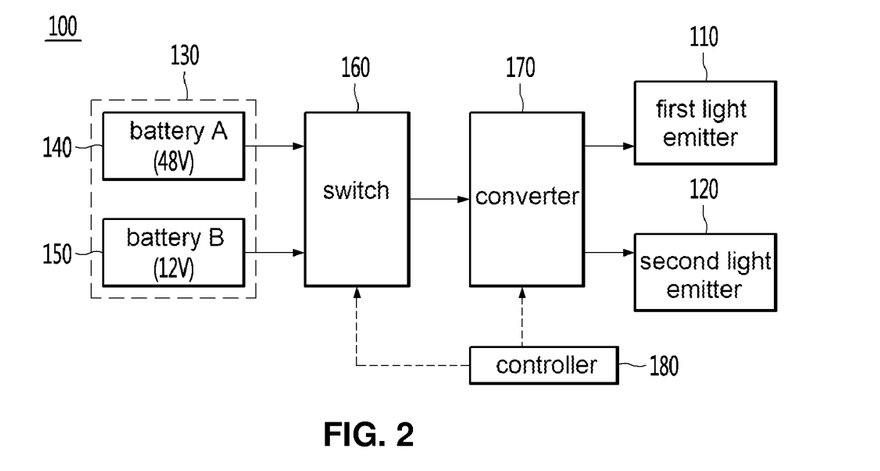
FIG. 2 is a block diagram showing the configuration of alight source driving device according to an embodiment of the present invention.

FIG. 2 is a block diagram showing the configuration of alight source driving device according to an embodiment of the present invention.

Referring to FIG. 2, the light source driving device 100 includes a battery part 130 and a DC-DC converter. In addition, the DC-DC converter includes a first light emitter 110, a second light emitter 120, a switch 160, a converter 170, and a controller 180.

The first light emitter 110 and the second light emitter 120 receive a driving voltage from the converter 170 to perform light emission.

The first and second light emitters 110 and 120 may constitute a vehicle brake lamp, a tail lamp, a backup lamp, or a turn signal lamp. That is, the first and second light emitters 110 and 120 may have a configuration in which at least two light sources of a vehicle brake, tail light, reversing light, and direction indicator are connected in parallel with each other.

In addition, the number of light emitting elements of each light emitter constituting the first and second light emitter 110 and 120 may vary according to the size or light output intensity required by a brake light, a tail light, a reversing light, or a direction indicator.

That is, one of the light emitters constituting the first and second light-emitter 110 and 120 may include only one light emitting element, and the other light emitter may include at least two light emitting elements. Alternatively, each of the light emitter constituting the first and second light emitter 110 and 120 may be configured to include only one light emitting element. In addition, differently, each of the light emitters constituting the first and second light emitters 110 and 120 may include at least two or more light emitting elements.

The battery part 130 provides input power for supplying power required to a load. The standard of the battery part 130 may be changed according to a product to which the DC-DC converter is applied. Preferably, the DC-DC converter may be applied to a vehicle, and the battery part 130 may be a battery provided in the vehicle.

In addition, the battery part 130 may include a battery A 140 that outputs a first voltage and a battery B 150 that outputs a second voltage. Here, the first voltage may be any one of 12V and 48V, and the second voltage may be the other one of 12V and 48V. Hereinafter, for convenience of description, it will be described that the battery A 140 is a 48V battery, and the battery B 150 is a 12V battery. However, this is only an embodiment of the present invention, and the specifications of the battery A 140 and the battery B 150 may vary.

The switch 160 is connected to any one of a plurality of batteries constituting the battery part 130, and accordingly supplies a voltage output from the connected battery to the converter 170.

Preferably, the switch 160 is connected to the battery A 140, and accordingly, a voltage of 48V may be provided to the converter 170. In addition, differently, the switch 160 is connected to the battery B 150, and accordingly, a voltage of 12V can be provided to the converter 170.

In this case, the first light emitter 110 is a load requiring a voltage higher than the voltages of the battery A 140 and the battery B 150, and the second light emitter 120 may be a load that requires a voltage lower than the voltages of the battery A 140 and the battery B 150. For example, the first light emitter 110 may include alight emitting element that emits light with a driving voltage of 60V, and the second light emitter 120 may include a light emitting element that emits light with a driving voltage of 3V.

Meanwhile, each of the first and second light emitter 110 and 120 may include at least one light emitting element. In this case, each of the first and second light emitters 110 and 120 may include a semiconductor light emitting element such as a light emitting diode (LED), a light emitting element package or a light emitting device in which the semiconductor light emitting element is adopted. However, this is not limited.

The converter 170 is connected to any one of the battery A 140 and the battery B 150 through the switch 160, and accordingly, the first light emitter 110 and the second light emitter 120 is selectively supplied with a driving voltage.

The converter 170 may operate in a plurality of driving modes, respectively.

The driving mode includes a first driving mode in which both the first light emitter 110 and the second light emitter 120 operate, a second driving mode in which only the first light emitter 110 operates, and a third driving mode in which only the second light emitter 120 operates.

In addition, the converter 170 supplies driving voltages to the first light emitter 110 and the second light emitter 120, respectively, in the first driving mode. In addition, the converter 170 selectively supplies a driving voltage to only the first light emitter 110 in the second driving mode. In addition, the converter 170 selectively supplies a driving voltage to only the second light emitter 120 in a third driving mode.

To this end, the converter 170 may include a first converter (described later) connected to the switch 160 and a second converter connected to an output terminal of the first converter. In addition, the first converter may boost the output voltage of the battery connected through the switch 160 and supply to the first light emitter 110. In addition, the second converter is connected to a node between the output terminal of the first converter and a cathode terminal of the first light emitter 110, and step down a voltage applied to the node to supply to the second light emitter 120.

In addition, each of the first converter and the second converter includes a switching element, and operations of the first and second converters may be controlled according to an operation of the switching element. In this case, the first converter may be configured as a boost type, and the second converter may be configured as a buck type. The boost type converter has a characteristic that an output voltage is higher than an input voltage, and the buck type converter has a characteristic that an output voltage is lower than an input voltage.

The controller 180 may connect any one of the battery A 140 and the battery B 150 to the converter 170 according to driving conditions of the first and second light emitters 110 and 120. In other words, the controller 180 may control the switch 160 to select a battery connected to the converter 170. The connected battery may vary according to the driving mode.

For example, the controller 180 may control the switch 160 so that the converter 170 is connected to the battery A 140 in the first driving mode. In addition, the controller 180 may control the switch 160 so that the converter 170 is connected to the battery A 140 in the second driving mode. In addition, the controller 180 may control the switch 160 so that the converter 170 is connected to the battery B 150 in the third driving mode.

In addition, the controller 180 may control the first converter and the second converter according to the driving mode, respectively. Preferably, the controller 180 controls a switching operation of each of the switching elements constituting the first converter and the second converter according to the driving mode.

As described above, the battery part 130 in the present invention includes a battery A 140 and a battery B 150. In addition, a switch 160 is disposed between output terminals of the battery A 140 and the battery B 150 and an input terminal of the converter 170 to select input power to supply power to the converter 170.

In addition, in the present invention, the first light emitter 110 and the second light emitter 120, which require different conditions as described above, are commonly connected to one converter 170, and accordingly, a driving mode of the converter 170 can be classified according to the operating conditions of each light emitter.

In the present invention, as described above, a plurality of converters are integrated into one, thereby stably driving a plurality of loads requiring different voltages. Accordingly, in the present invention, a space in which the converter is disposed can be minimized by integrating a plurality of converters into one. In addition, in the present invention, by sharing at least a part of the first and second converters with each other, it is possible to drastically reduce necessary components, thereby reducing product cost.

In addition, an embodiment according to the present invention provides a DC-DC converter that is connected to a 48V battery and a 12V battery and stably provides a driving voltage to each load according to an input voltage. Furthermore, in the present invention, a battery to provide the input voltage is selected according to a load to be driven among a plurality of loads. That is, the DC-DC converter in the present invention can be applied to both a two-way battery system including both 12V and 48V batteries, or a separate battery system including only one of them. Accordingly, in the present invention, power conversion efficiency can be increased by selecting a battery to provide the input voltage from among the plurality of batteries according to a load condition, thereby increasing the efficiency of an electronic device.

Hereinafter, with reference to the accompanying drawings, the operation of the DC-DC converter shown in FIG. 2 will be described in more detail.

Figure 3:
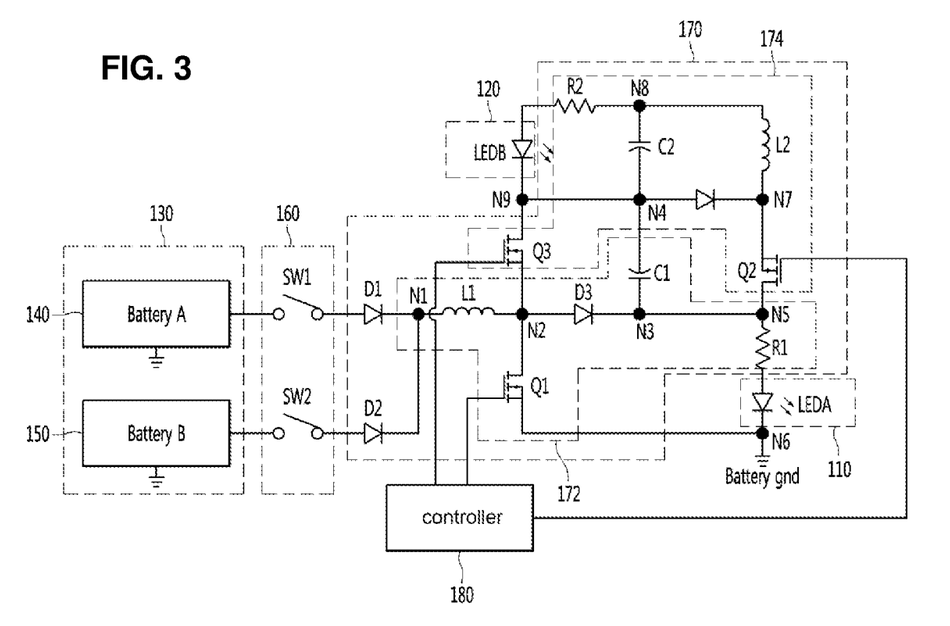
FIG. 3 is a detailed circuit diagram of the DC-DC converter shown in FIG. 2.

FIG. 3 is a detailed circuit diagram of the DC-DC converter shown in FIG. 2.

Referring to FIG. 3, the DC-DC converter includes a first light emitter 110, a second light emitter 120, a switch 160, a converter 170, and a controller 180.

In addition, the converter 170 includes a first converter 172 and a second converter 174.

The first converter 172 includes a first inductor (L1), a first switch element (Q1), a third diode (D3), a first capacitor (C1), and a first resistor (R1).

In addition, the second converter 174 includes a second switch element Q2, a second inductor L2, a second capacitor C2, a second resistor R2, and a third switch element Q3.

Meanwhile, the switch 160 includes a first switch SW1 and a second switch SW2.

One terminal of the first switch SW1 is connected to an output terminal of the battery A 140 and other terminal of the first switch SW1 is connected to an input terminal of the converter 170.

In addition, the second switch SW2 has one terminal connected to an output terminal of the battery B 150 and the other terminal connected to the input terminal of the converter 170.

Here, the input terminal of the converter 170 may be the first node N1 shown in FIG. 3.

The controller 180 may control an on-off operation of the first switch SW1 and the second switch SW2, and accordingly, select a battery to supply an input voltage to the converter 170.

In this case, a default condition for selection of the battery may be determined according to the charging capacity of the battery A 140 and the battery B 150.

In addition, the battery selection condition may be determined according to driving conditions of the first and second light emitters 110 and 120. Preferably, the battery selection condition may be determined according to a driving mode of the DC-DC converter.

Meanwhile, the first switch SW1 and the second switch SW2 may operate complementarily within a condition in which the DC-DC converter operates. In other words, when the first switch SW1 is turned on, the second switch SW2 may be turned off. Conversely, when the first switch SW1 is turned off, the second switch SW2 may be turned on. In addition, when the DC-DC converter does not operate, both the first switch SW1 and the second switch SW2 may be turned off.

Preferably, a diode for preventing current from flowing in a reverse direction may be additionally disposed between the first switch SW1 and the second switch SW2 and the DC-DC converter.

That is, a first diode D1 may be disposed between the first switch SW1 and the DC-DC converter, and a second diode D2 may be disposed between the second switch SW2 and the DC-DC converter.

The first diode D1 may have an anode terminal connected to the other terminal of the first switch SW1, and a cathode terminal connected to the first node N1, which is an input terminal of the DC-DC converter. Accordingly, one terminal of the first switch SW1 may be connected to the output terminal of the battery A 140 and the other terminal may be connected to the anode terminal of the first diode D1.

In addition, the second diode D2 may have an anode terminal connected to the other terminal of the second switch SW2, and a cathode terminal connected to the first node N1, which is an input terminal of the DC-DC converter. Accordingly, one terminal of the second switch SW2 may be connected to the output terminal of the battery B 150 and the other terminal may be connected to the anode terminal of the second diode D2.

The DC-DC converter supplies power for driving the first light emitter 110 (LED A) and the second light emitter 120 (LED B). To this end, the DC-DC converter comprises the first light emitter 110 (LED A) and the second light emitter 120 (LED B) corresponding to a load, and a converter 170 supplying power to the load. In addition, the converter 170 includes a first converter 172 that generates an output voltage obtained by boosting the input voltage, and a second converter 174 that generates an output voltage by stepping down the input voltage.

In other words, the converter 170 includes a first converter 172 of a boost type and a second converter 174 a buck type.

The first converter 172 may include a first inductor (L1), a first switch element (Q1), a third diode (D3), a first capacitor (C1), and a first resistor (R1).

One terminal of the first inductor L1 may be connected to the first node N1 and the other terminal may be connected to a second node N2.

In addition, the first switching device Q1 may have a first terminal connected to the second node N2, a second terminal connected to a sixth node N6, and a third terminal connected to the controller 180. Here, the first terminal of the first switch element Q1 may be a drain terminal, the second terminal of the first switch element Q1 may be a source terminal, and the third terminal of the first switch element Q1 may be a gate terminal. Preferably, the first switch element Q1 may be an N-channel field effect transistor (FET). However, this is only an embodiment of the present invention, and the first switch element Q1 may be implemented as a transistor of another type except for the N-channel FET.

The third diode D3 may have an anode terminal connected to the second node N2 and a cathode terminal connected to the third node N3.

In addition, one terminal of the first capacitor C1 may be connected to a third node N3 and the other terminal may be connected to a fourth node N4.

In addition, one terminal of the first resistor R1 may be connected to a fifth node N5 and the other terminal may be connected to the input terminal of the first light emitter 110 (LED A).

Here, among the components constituting the first converter 172, the first inductor L1, the first switch element Q1, and the third diode D3 have a power conversion function that boosts and outputs an input voltage, the first capacitor C1 is a component that functions as a filter to remove the AC component included in the output voltage, and the first resistor R1 is a component that functions as a protection for limiting the output current supplied to the first light emitter 110 (LED A).

In addition, the second converter 174 may include a second inductor (L2), a second switch element (Q2), a fourth diode (D4), a second capacitor (C2), a third switch element (Q3) and a second resistor R2.

The second switch element Q2 may have a first terminal connected to the fifth node N5, a second terminal connected to a seventh node N7, and a third terminal connected to the controller 180. Here, the first terminal of the first switch element Q1 may be a drain terminal, the second terminal may be a source terminal, and the third terminal may be a gate terminal. Preferably, the second switch element Q2 may be an N-channel Field Effect Transistor (FET). However, this is only an embodiment of the present invention, and the second switch element Q2 may be implemented as a transistor of another type except for the N-channel FET.

One terminal of the second inductor L2 may be connected to the seventh node N7 and the other terminal may be connected to the eighth node N8.

The fourth diode D4 may include an anode terminal connected to the fourth node N4 and a cathode terminal connected to the seventh node N7.

In addition, one terminal of the second capacitor C2 may be connected to the fourth node N4 and the other terminal may be connected to the eighth node N8.

In addition, one terminal of the second resistor R2 may be connected to the eighth node N8 and the other terminal may be connected to the input terminal of the second light emitter 120 (LED B).

In addition, the third switch element Q3 may have a first terminal connected to the ninth node N9, a second terminal connected to the second node N2, and a third terminal connected to the controller 180. Here, the first terminal of the third switch element Q3 may be a drain terminal, the second terminal may be a source terminal, and the third terminal may be a gate terminal. Preferably, the third switch element Q3 may be an N-channel Field Effect Transistor (FET). However, this is only an embodiment of the present invention, and the third switch element Q3 may be implemented as a transistor of another type except for the N-channel FET.

Here, among the components constituting the first converter 172, the second inductor L2, the second switch element Q2, and the fourth diode D4 step down and output an input voltage, and the second capacitor C2 functions as a filter to remove the AC component included in the output voltage, and the second resistor R2 serves as a protection for limiting the output current supplied to the second light emitter 120 (LED B), and the third switch element Q3 is a component that functions as a floating ground for securing reliability of an on-off operation of the second switch element Q2.

Here, the first switch element Q1 and the second switch element Q2 repeat on or off operation according to a pulse width modulated signal PWM supplied from the controller 180, so that the amount of current supplied from the first inductor L1 or the second inductor L2 to the first light emitter 110 (LED A) and the second light emitter 120 (LED B) may be controlled.

In addition, as described above, each of the first switch element Q1, the second switch element Q2, and the third switch element Q3 is marked as a power MOSFET for convenience, but the present invention is not limited thereto, and it may be configured as an on-off controllable device according to power capacity.

The DC-DC converter receives an input voltage from the battery A 140 or the battery B 150. In addition, the first converter 172 may output a first output voltage to the fifth node N5 according to an on-off operation of the first switch element Q1.

In addition, the second converter 174 changes the magnitude of the first output voltage applied to the fifth node N5 according to the on-off operation of the second switch element Q2 to output a second output voltage to the eighth node N8.

In this case, the first output voltage may be greater than the input voltage (a voltage output from the battery A 140 or the battery B 150), and the second output voltage may be less than the input voltage.

In addition, the third switch element (Q3) selectively turns on according to the voltage applied to the fifth node (N5), the output terminal of the second light emitter 120 (LED B) is floating ground.

That is, the second light emitter 120 (LED B) operates under a condition requiring a voltage lower than the input voltage. In this case, the input voltage may already be boosted through the first converter 172, and the second converter 174 generates the second output voltage by stepping down the boosted voltage. At this time, when the difference between the first output voltage and the second output voltage is large, it may be difficult to stably drive the second switch element Q2. Accordingly, the third switch element Q3 operates on according to the voltage applied to the fifth node N5, as the third switch element Q3 is turned on, the potential of the eighth node N8 increases. In addition, as the potential of the eighth node N8 increases, a duty ratio of the pulse width modulated signal supplied to the second switch element Q2 increases. In addition, as the duty ratio of the pulse width modulated signal increases, the second switch element Q2 may be stably driven. This will be described in more detail below.

Hereinafter, a switching operation of the first switch element Q1, the second switch element Q2, and the third switch element Q3 according to the driving mode of the DC-DC converter will be described.

In the present invention, the driving mode of the DC-DC converter can be largely divided into three modes.

Preferably, the driving mode includes a first driving mode for driving all of the first light emitter 110 (LED A) and the second light emitter 120 (LED B), a second driving mode for driving only the first light emitter 110 (LED A) and a third driving mode for driving only the second light emitter 120 (LED B).

FIG. 4 to 7 are views showing an operating state of a switching element in a first driving mode of the DC-DC converter of the present invention.

The DC-DC converter includes: a first period for charging the first inductor L1 in the first driving mode, a second period for outputting energy accumulated in the first inductor L1, a third period for charging the second inductor L2, and a fourth period for outputting energy accumulated in the second inductor L2. In the second period, a driving current is supplied to the first light emitter 110 (LED A) so that the first light emitter 110 (LED A) may perform alight emission operation. In addition, in the fourth period, a driving current is supplied to the second light emitter 120 (LED B) so that the second light emitter 120 (LED B) may perform alight emission operation.

Figure 4:
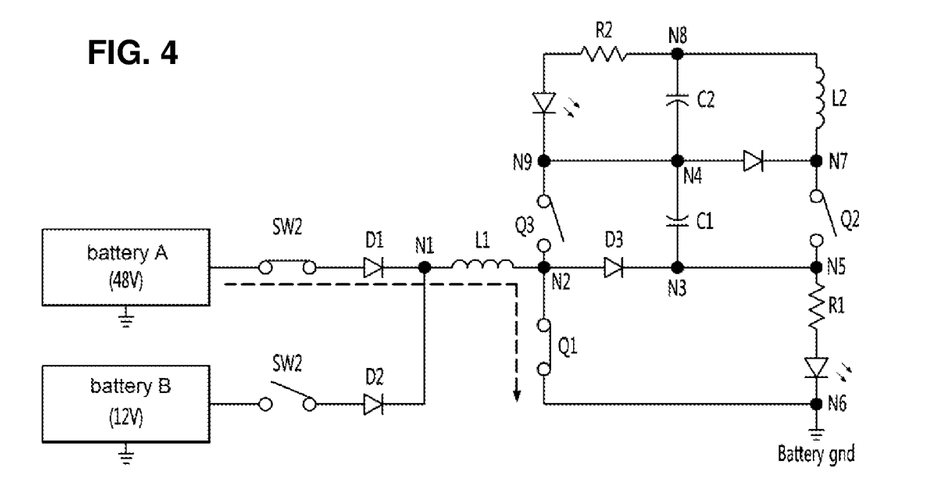
FIGS. 4 to 7 are views showing an operating state of a switching element in a first driving mode of the DC-DC converter of the present invention.

FIG. 4 is a diagram illustrating an operating state of switch elements in the first period and a current flow accordingly.

Referring to FIG. 4, during the first period, the first switch element Q1 is turned on, and the second switch element Q2 and the third switch element Q3 are turned off.

At this time, one of the first switch SW1 and the second switch SW2 is turned on to apply an input voltage to the DC-DC converter. Here, for convenience of description, it will be described that the first switch SW1 of the first switch SW1 and the second switch SW2 is turned on and the second switch SW2 is turned off. Accordingly, an input voltage of 48V may be applied to the input terminal (preferably, the first node N1) of the DC-DC converter.

In addition, the current in the first period flows through a first switch (SW1), a first diode (D1), a first node (N1), an inductor (L1), a first switch element (Q1) and a sixth node (N6). Further, the current charges the first inductor L1, so that the first inductor L1 accumulates energy.

Figure 5:
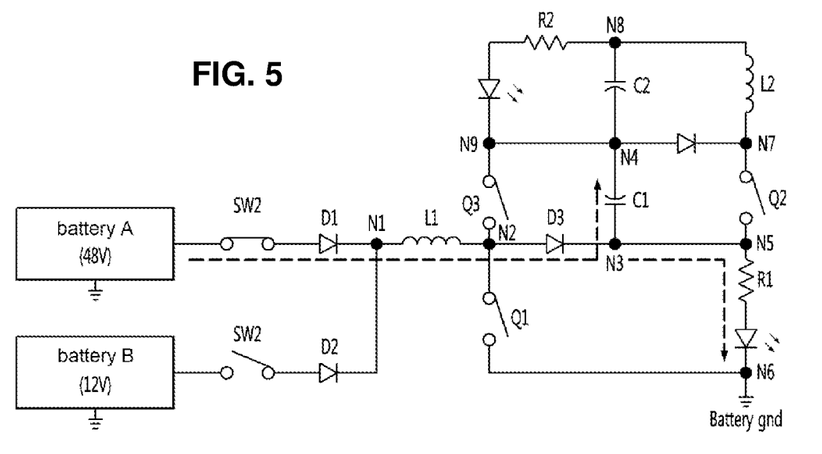

FIG. 5 is a view showing an operating state of switch elements and a current flow accordingly in the second period.

Referring to FIG. 5, during the second period, the first switch element Q1 is turned off, and the second switch element Q2 and the third switch element Q3 maintain a turned off state. That is, in the second period, the first switch element Q1, which was turned on in the first period, is turned off. Accordingly, the voltage at the first terminal side of the first switch element Q1 becomes a zero voltage. In addition, energy accumulated in the first inductor L1 is charged in the first capacitor C1 through the third diode D3 to form a voltage higher than the input voltage.

In addition, energy charged in the first capacitor C1 is supplied to the first light emitter 110 (LED A) through the fifth node N5.

That is, the current in the second period is supplied to the first light emitter 110 (LED A) through the third diode (D3), the third node (N3), the first capacitor (C1), the fifth node (N5), and the first resistor (R1).

In this case, the output voltage of the first converter 172 applied to the fifth node N5 is determined by the gate duty ratio of the first switch element Q1. That is, the output voltage may be determined by Equation 1 below.

$$Vout = \left(\frac{1}{D}\right) * Vin \quad \text{[Equation 1]}$$

In this case, Vout is an output voltage of the first converter 172 applied to the fifth node N5, D is a gate duty ratio of the first switch element Q1, and Vin is an input voltage output from the battery A 140.

At this time, when the first light emitter 110 (LED A) has 20 light emitting elements connected in series and a forward voltage of each light-emitting element is 3V, the output voltage of the first converter (The output voltage of 172) needs to be 60V.

In addition, under the above conditions, the gate duty ratio may be determined to be 0.7, a pulse width modulated signal having an on time of 70% corresponding to the determined duty ratio may be generated through the controller 180 and provided to the first switch element Q1.

In addition, under the same conditions as above, when an input voltage of 12V is supplied from the battery B 150 instead of the battery A 140, the duty ratio of the pulse width modulated signal supplied to the first switch element Q1 may be determined to be 0.2, and accordingly, the pulse width modulated signal may have an on time of 20%.

Figure 6:
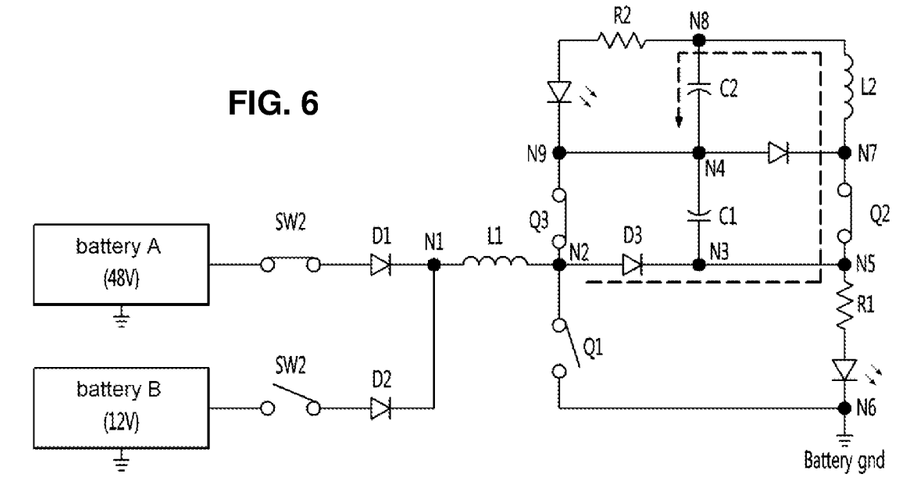

FIG. 6 is a view showing an operating state of the switch elements in the third period and a current flow accordingly.

Referring to FIG. 6, during the third period, the first switch element Q1 is maintained in a turned-off state, and the second switch element Q2 and the third switch element Q3 are turned on.

In addition, the current in the third period is provided through the first converter 172 to the fifth node N5, this flows through the second switch element Q2, the second inductor L2, and the second inductor L2. In addition, the current charges the second inductor L2 and the second capacitor C2, so that the second inductor L2 and the second capacitor C2 accumulate energy.

In this case, the first switch element Q1 operates in a turned-off state during the third period in the first driving mode, but current is continuously supplied to the first light emitter 110 (LED A). That is, the first light emitter 110 (LED A) in the third period in which the first switch element (Q1) is operated in a turned-off state may be driven by a battery voltage input from the battery A (140) and current limiting according to the resistance R1.

Figure 7:
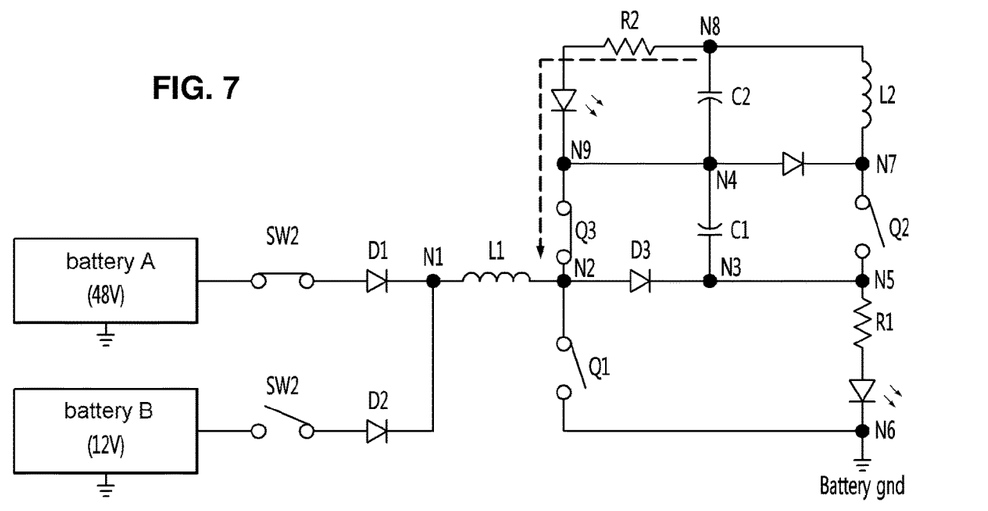

FIG. 7 is a diagram illustrating an operation state of the switch elements in the fourth period and a current flow accordingly.

Referring to FIG. 7, during the fourth period, the first switch element Q1 maintains a turn-off state, and the third switch element Q3 maintains a turn-on state, and the second switch element Q2 is turned off. Accordingly, the energy accumulated in the second capacitor C2 in the third period is discharged to the second light emitter 120 (LED B), and thus the light emission operation of the second light emitter 120 (LED B) may be performed.

Meanwhile, during the third and fourth periods as described above, the third switch element Q3 is turned on. This is to stably convert the first output voltage of the first converter 172 applied to the fifth node N5 into a second output voltage in the second converter 174.

For example, the second light emitter 120 (LED B) may include one light-emitting element, and the light emitting element may have a forward voltage of 3V. Further, a voltage of 60V is applied to the fifth node N5, and accordingly, the second converter 174 must convert the voltage of 60V to a voltage of 3V.

Further, the conversion is performed by control of the second switch element Q2 constituting the second converter 174. In other words, the second output voltage of the second converter 174 is determined according to the duty ratio of the pulse width modulated signal supplied to the second switch element Q2. In this case, the second output voltage may be equal to Equation 2 below.

$$Vout = D * Vin \quad \text{[Equation 2]}$$

Here, Vout is the second output voltage output from the second converter 174, D is the duty of the pulse width signal supplied to the second switch element Q2, Vin is the first output voltage of the first converter 172 (In other words, this may be referred to as a voltage input to the second converter 174, and may also be expressed as a voltage applied to the fifth node N5).

At this time, as described above, in order to convert an input voltage of 60V into an output voltage of 3V, the duty of the pulse width modulated signal is 0.05. In other words, for the conversion as described above, the on time in the pulse width modulated signal supplied to the second switch element Q2 has 5%.

However, when the second converter 174 operates with a pulse width modulated signal having an on time of 5% as described above, since the on time is relatively too short, energy cannot be sufficiently transferred. Accordingly, it is difficult to stably drive the second converter 174.

Accordingly, in the present invention, the third switch element Q3 is disposed at the output terminal of the second light emitter 120 (LED B), and a floating ground can be formed according to the third switch element Q3.

In other words, in the case where the third switch element Q3 is turned on in the third period and the fourth period, which are the operating periods of the second converter 174, the potential of the output terminal of the second light emitter 120 (LED B) is increased. That is, when the third switch element Q3 is turned on, the potential of the output terminal of the second light emitter 120 (LED B) increases as much as the battery voltage.

This means that when the third switch element Q3 is turned on, an offset occurs in the floating ground by the potential of the input voltage. At this time, when the first switch SW1 is turned on and an input voltage is applied from the battery A 140 accordingly, the offset occurs by 48V.

Accordingly, the second converter 174 performs the conversion operation based on the remaining voltage by subtracting 48V corresponding to the offset from 60V, which is the first output voltage of the first converter 172 corresponding to the input voltage. In other words, the offset occurs according to the turn-on operation of the third switch element Q3, accordingly, the second converter 174 may convert the input voltage of 12V by subtracting the 48V from the 60V into 3V. In this case, the duty of the pulse width modulated signal supplied to the second switch element Q2 is 0.25, has an on time of 25%. Therefore, the second converter 174 performs a switching operation based on the pulse width modulated signal having the 25% on time, accordingly, a stable driving condition of the second converter 174 may be formed. In conclusion, the third switch element Q3 may be formed to control on-off of the second light emitter 120 (LED B) or to determine whether or not an offset of floating ground is applied according to an input battery voltage.

According to an embodiment of the present invention, it is possible to provide an integrated DC-DC converter capable of driving a plurality of loads, respectively, under load conditions requiring different voltages. That is, the DC-DC converter includes a first converter connected to a power input part, a first load disposed at an output terminal of the first converter, a second converter disposed at an output terminal of the first converter, and a second load disposed at an output terminal of the second converter. In the present invention, as described above, a plurality of converters are integrated into one, thereby stably driving a plurality of loads requiring different voltages. Accordingly, in the present invention, a space in which the converter is disposed can be minimized by integrating a plurality of converters into one. In addition, in the present invention, by sharing at least a part of the first and second converters with each other, it is possible to drastically reduce necessary components, thereby reducing product cost.

In addition, an embodiment according to the present invention provides a DC-DC converter that is connected to a 48V battery and a 12V battery and stably provides a driving voltage to each load according to an input voltage.

Furthermore, in the present invention, a battery to provide the input voltage is selected according to a load to be driven among a plurality of loads. That is, the DC-DC converter in the present invention can be applied to both a two-way battery system including both 12V and 48V batteries, or a separate battery system including only one of them. Accordingly, in the present invention, power conversion efficiency can be increased by selecting a battery to provide the input voltage from among the plurality of batteries according to a load condition, thereby increasing the efficiency of an electronic device.

In addition, in the present invention, by using a floating ground, a load having a high input voltage and a low forward voltage can be stably driven. In addition, in the present invention, by controlling the switching element based on a high duty ratio, it is possible to increase the stability of the driving circuit and increase the efficiency at the same time.

In addition, the DC-DC converter may operate in a second driving mode for driving only the first light emitter 110 (LED A).

The DC-DC converter includes a first period for charging the first inductor L1 in the second driving mode, and a second period for outputting energy accumulated in the first inductor L1. In the second period, a driving current is supplied to the first light emitter 110 (LED A) so that the first light emitter 110 (LED A) may perform a light emission operation.

In this case, since the first period and the second period in the second driving mode are substantially the same as the first period and the second period in the first driving mode, the illustration thereof will be omitted.

In the first period in the second driving mode, the first switch element Q1 is turned on, and the second switch element Q2 and the third switch element Q3 are turned off.

At this time, one of the first switch SW1 and the second switch SW2 is turned on to apply an input voltage to the DC-DC converter. Here, for convenience of description, it will be described that the first switch SW1 of the first switch SW1 and the second switch SW2 is turned on and the second switch SW2 is turned off. Accordingly, an input voltage of 48V may be applied to the input terminal (preferably, the first node N1) of the DC-DC converter.

In addition, the current in the first period flows through a first switch (SW1), a first diode (D1), a first node (N1), an inductor (L1), a first switch element (Q1) and a sixth node (N6). Further, the current charges the first inductor L1, so that the first inductor L1 accumulates energy.

In addition, in the second period in the second driving mode, the first switch element Q1 is turned off, and the second switch element Q2 and the third switch element Q3 maintain a turned off state. That is, in the second period in the second driving mode, the first switch element Q1 that was turned on in the first period is turned off. Accordingly, the voltage at the first terminal side of the first switch element Q1 becomes a zero voltage. In addition, energy accumulated in the first inductor L1 is charged in the first capacitor C1 through the third diode D3 to form a voltage higher than the input voltage.

In addition, energy charged in the first capacitor C1 is supplied to the first light emitter 110 (LED A) through the fifth node N5.

That is, the current in the second period is supplied to the first light emitter 110 (LED A) through the third diode (D3), the third node (N3), the first capacitor (C1), the fifth node (N5), and the first resistor (R1).

In addition, the DC-DC converter may operate in a third driving mode for driving only the second light emitter 120 (LED B).

The DC-DC converter includes a first period for charging the second inductor L2 and the second capacitor C2 in the third driving mode, and a second period in which the energy accumulated in the second capacitor C2 is output. In the second period, a driving current is supplied to the second light emitter 120 (LED B) so that the second light emitter 120 (LED B) may perform a light emission operation.

Figure 8:
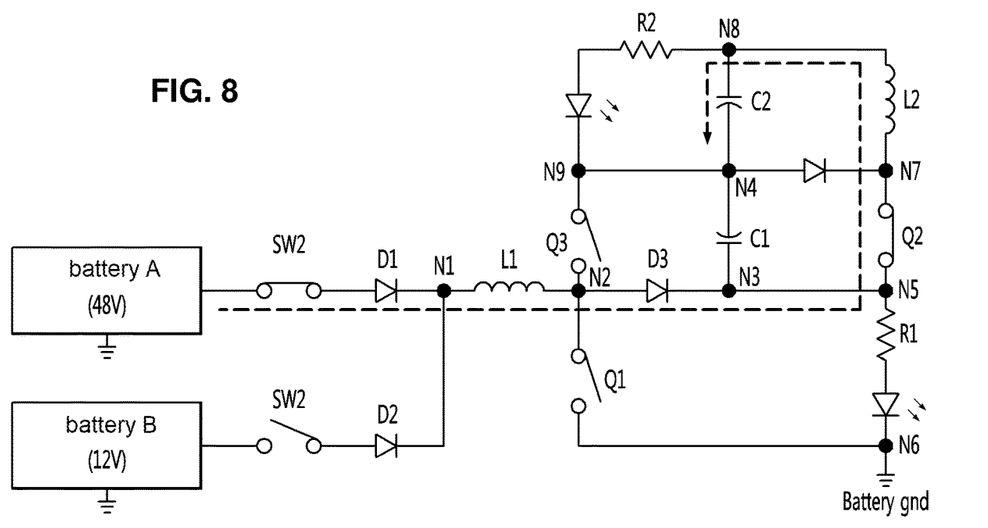
FIGS. 8 and 9 are diagrams showing an operating state of a switching element in a third driving mode of the DC-DC converter of the present invention.
Figure 9:
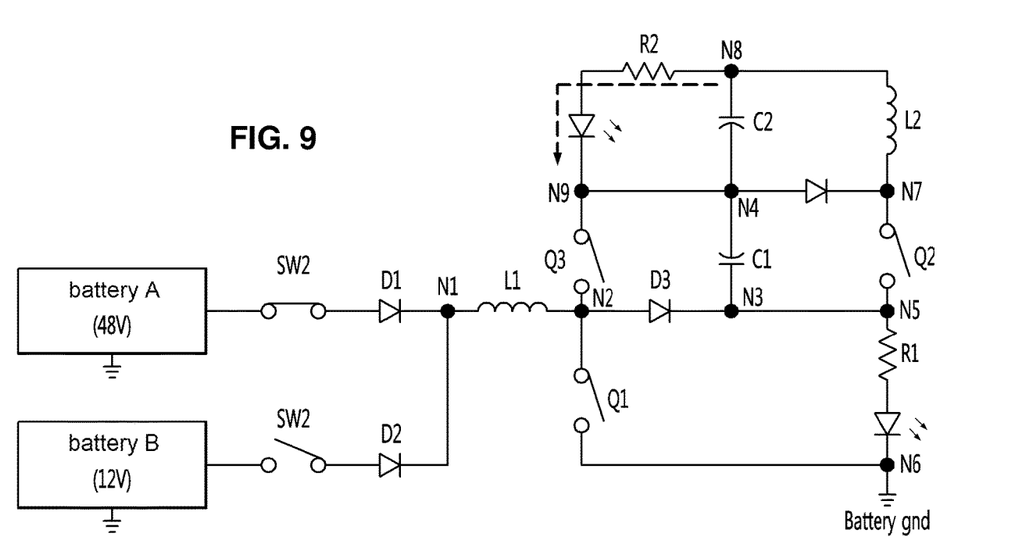

FIG. 8 is a diagram showing an operating state of the switch elements in a first period of a third driving mode and a current flow, and FIG. 9 is a diagram illustrating an operating state of the switch elements in a second period of a third driving mode and a current flow.

Referring to FIG. 8, in a first period in the third driving mode, the first and third switch elements Q1 and Q3 are turned off, and the second switch element Q2 is turned on.

At this time, one of the first switch SW1 and the second switch SW2 is turned on to apply an input voltage to the DC-DC converter. Here, for convenience of description, it will be described that the first switch SW1 of the first switch SW1 and the second switch SW2 is turned on and the second switch SW2 is turned off. Accordingly, an input voltage of 48V may be applied to the input terminal (preferably, the first node N1) of the DC-DC converter.

In addition, the current in the first period of the third driving mode flows through the first switch (SW1), the first diode (D1), the first node (N1), the first inductor (L1), the first capacitor (C1), the third node, the fifth node, the second switch element Q2, the second inductor L2, the eighth node N8, and the second capacitor C2. Further, the current charges the second inductor L2 and the second capacitor C2, so that the second inductor L2 and the second capacitor C2 accumulate energy.

In this case, unlike the first driving mode and the second driving mode, the input voltage of the battery is applied to the fifth node N5 in the third driving mode as it is. In addition, the first switch element Q1 of the first converter 172 does not substantially operate. Here, current flows through the first inductor L1 and the first capacitor C1 of the first converter 172 to the second converter 174 in the third driving mode. Accordingly, in the third driving mode, the first inductor L1 and the first capacitor C1 serve as an L-C filter, thereby removing noise included in the input voltage.

This means that when the wire harness is lengthened due to the structure of the vehicle, the first inductor L1 and the first capacitor C1 of the first converter 172 serve as a filter for the second light emitter 120 (LED B), and it is possible to increase the reliability of the DC-DC converter.

In addition, referring to FIG. 9, in the second period in the third driving mode, the first and third switch elements Q1 and Q3 are maintained in a turned-off state, and the second switch element (Q2) is turned off. Accordingly, the energy accumulated in the second capacitor C2 is supplied to the second light emitter 120 (LED B) through the eighth node N8.

That is, the current in the second period is supplied to the second light emitter 120 (LED B) through the second capacitor C2, the eighth node N8, and the second resistor R2.

As described above, in the present invention, the L-C output filter can be used to minimize output noise, and accordingly, the L-C filter in a load requiring a high voltage can be reinforced.

Meanwhile, the third switch element Q3 is maintained in a turned-on state only under the condition that the second converter 174 operates in the first driving mode as described above, and the third switch element Q3 maintains a turn-off state in the second driving mode and the third driving mode. That is, the third switch element Q3 may operate under a condition in which the second converter 174 operates, and when an input voltage is higher than a battery voltage.

For example, the third switch element (Q3) is turned on under a condition in which the second converter 174 operates, and when a voltage of 60V higher than the battery voltage is input to the second converter 174.

Meanwhile, in the present invention, the first converter 172 of the boost type is preferentially arranged among the converter 170 constituting the DC-DC converter as described above, and the second converter 170 is disposed at the rear end of the first converter 172.

This is determined according to the arrangement of components constituting the first converter 172 and the second converter 174. That is, the first inductor L1 is disposed at the input terminal of the boost type first converter 172. In addition, a second switch element Q2 is disposed at an input terminal of the buck-type second converter 174. In this case, in the present invention, the switching operation of the switch elements is performed according to each driving mode. Here, when the positions of the first converter 172 and the second converter 174 are changed, the second switch element Q2 constituting the second converter 174 receives the input voltage of the battery. In this case, the second switch element Q2 performs an ON operation and an OFF operation according to the pulse width modulated signal. However, while the second switching element Q2 is performing the OFF operation, a situation in which current is not supplied to the rear stage may occur. Accordingly, in the present invention, the first converter 172 of the boost type is preferentially arranged as described above. In addition, for the power conversion operation of the second converter 174, stable driving is performed by adjusting the offset of the floating ground as described above.

On the other hand, in the present invention, the battery part 130 is composed of a plurality of batteries respectively supplying different input voltages, accordingly, this can be applied to a battery hybrid method that combines a bus of a 48V battery with a 12V system that has been recently developed. In addition, the present invention is not used only to the hybrid method, but can be used independently in a battery method using only 12V or a battery method using 48V battery.

In this case, when the DC-DC converter of the present invention is applied to a battery hybrid method, the controller 180 enables to select a battery to which the input voltage is to be applied according to the driving mode.

That is, the controller 180 controls the operation of the first and second switches SW1 and SW2 according to the first to third driving modes, so that a battery connected to the DC-DC converter can be determined.

In this case, the controller 180 turns on the first switch SW1 and turns off the second switch SW2 in the first driving mode. And, in the first driving mode, an input voltage of 48V is applied to the DC-DC converter. That is, in the first driving mode, both the first converter 172 and the second converter 174 operate. In this case, in order to increase the power conversion efficiency of the first converter 172, the input voltage is applied from the battery A 140 that is not significantly different from 60V, which is the output voltage of the first converter 172.

In addition, in the first driving mode, the 60V voltage applied to the fifth node N5 must be converted into a voltage of 3V irrespective of the input voltage of the battery, thereby generating an offset with respect to the floating ground. In this case, as the offset is greater, the second switch element Q2 of the second converter 174 may be stably driven.

Accordingly, in the present invention, the input voltage of the DC-DC converter is applied from the battery A 140 in the first driving mode.

In addition, in the second driving mode, the controller 180 turns on the first switch SW1 and turns off the second switch SW2. In the second driving mode, an input voltage of 48V is applied to the DC-DC converter. That is, in the second driving mode, the first converter 172 operates. In this case, in order to increase the power conversion efficiency of the first converter 172, the input voltage is applied from the battery A 140, which is not significantly different from the 60V output voltage of the first converter 172.

In addition, the controller 180 turns off the first switch SW1 and turns on the second switch SW2 in the third driving mode. In the third driving mode, an input voltage of 12V is applied to the DC-DC converter. That is, in the third driving mode, the second converter 174 operates. In this case, in order to increase the power conversion efficiency of the second converter 174, the input voltage is applied from the battery B 150, which is not significantly different from 3V, which is the output voltage of the second converter 174. Further, in the third driving mode, the third switch element Q3 is maintained in an off state, and thus an offset does not occur in the floating ground. Accordingly, in order to secure a stable on time of the pulse width modulated signal supplied to the second switch element Q2, the input voltage of 12V is applied from the battery B 150 to the DC-DC converter.

Figure 10:
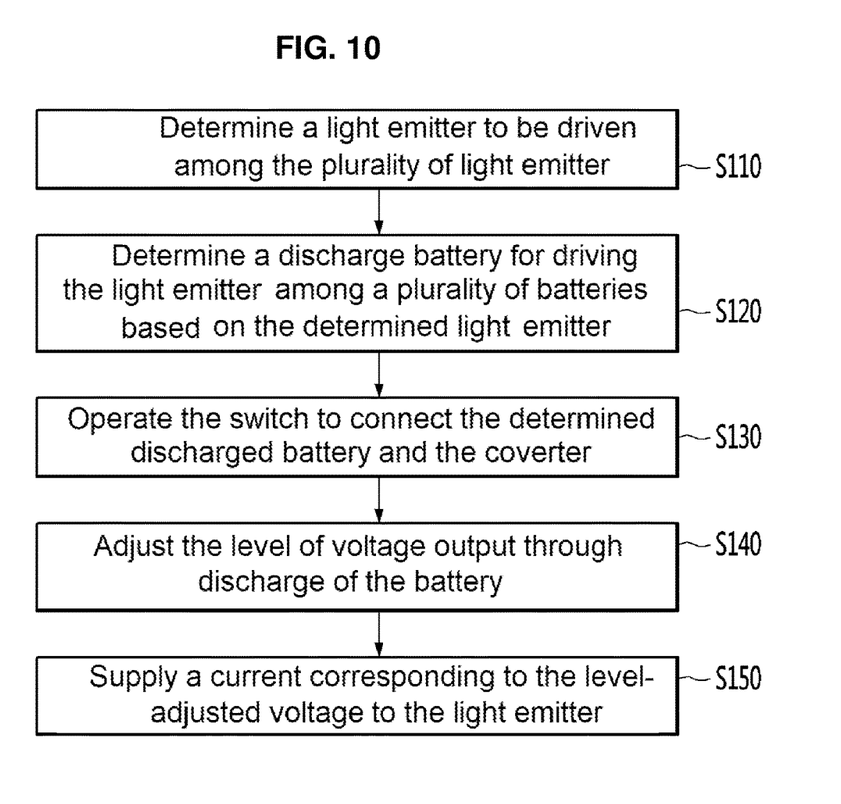
FIG. 10 is a flowchart illustrating a step-by-step method of driving a light source by a light source driving device according to an exemplary embodiment of the present invention.

FIG. 10 is a flowchart illustrating a step-by-step method of driving a light source by a light source driving device according to an exemplary embodiment of the present invention.

Referring to FIG. 10, the controller 180 determines a light emitter to perform a light emission operation among a plurality of light emitters according to a driving state of the vehicle (step 110). For example, the first light emitter 110 (LED A) may be a brake light, and the second light emitter 120 (LED B) may be a tail light. And, if the current driving state of the vehicle is a state that requires braking at night, the first and second light emitter may be determined as light emitters to perform the light emitting operation. In addition, when the current driving state of the vehicle is a state in which braking is required during the day, the controller 180 may determine only the first light emitter 110 (LED A) as the light emitter to perform the light emission operation. In addition, when the current driving state of the vehicle is a state in which normal constant speed driving at night, the second light emitter may be determined as a light emitter to perform the light emitting operation.

Subsequently, when the light emitter to perform the light emitting operation is determined, the controller 180 determines a driving mode of the DC-DC converter according to the determined light emitter, and determines a battery to which an input voltage is to be applied among a plurality of batteries according to the determined driving mode (step 120). That is, when the first and second light emitters are determined as light emitters to perform the light emitting operation, the controller 180 determines the driving mode as the first driving mode, and accordingly determines the battery A 140 as a battery to which the input voltage is to be applied.

In addition, when only the first light emitter is determined as the light-emitter to perform the light emitting operation, the controller 180 determines the driving mode as the second driving mode, and accordingly determines the battery A 140 as a battery to which the input voltage is to be applied.

In addition, when only the second light emitter is determined as the light-emitter to perform the light emitting operation, the controller 180 determines the driving mode as the second driving mode, and accordingly determines the battery B 150 as a battery to which the input voltage is to be applied.

Subsequently, the controller 180 controls the operation of the first switch SW1 and the second switch SW2 according to the determined battery (step 130). That is, when it is determined that the input voltage is applied from the battery A 140, the controller 180 turns on the first switch SW1 and turns off the second switch SW2. In addition, when it is determined that the input voltage is applied from the battery B 150, the controller 180 turns the first switch SW1 off and the second switch SW2 on.

Thereafter, the controller 180 outputs a control signal to adjust the level of the input voltage applied to the DC-DC converter from the battery according to the determined driving mode (step 140). That is, the controller 180 outputs a pulse width modulated signal for controlling switching operations of the first switch element Q1, the second switch element Q2, and the third switch element Q3, respectively.

In addition, a current is supplied to the first light emitter 110 (LED A) and/or the second light emitter 120 (LED B) corresponding to the determined driving mode by the switching operation of the first switch element (Q1), the second switch element (Q2) and the third switch element (Q3), accordingly, the light emission operation is performed.

According to an embodiment of the present invention, it is possible to provide an integrated DC-DC converter capable of driving a plurality of loads, respectively, under load conditions requiring different voltages. That is, the DC-DC converter includes a first converter connected to a power input part, a first load disposed at an output terminal of the first converter, a second converter disposed at an output terminal of the first converter, and a second load disposed at an output terminal of the second converter. In the present invention, as described above, a plurality of converters are integrated into one, thereby stably driving a plurality of loads requiring different voltages. Accordingly, in the present invention, a space in which the converter is disposed can be minimized by integrating a plurality of converters into one. In addition, in the present invention, by sharing at least a part of the first and second converters with each other, it is possible to drastically reduce necessary components, thereby reducing product cost.

In addition, an embodiment according to the present invention provides a DC-DC converter that is connected to a 48V battery and a 12V battery and stably provides a driving voltage to each load according to an input voltage. Furthermore, in the present invention, a battery to provide the input voltage is selected according to a load to be driven among a plurality of loads. That is, the DC-DC converter in the present invention can be applied to both a two-way battery system including both 12V and 48V batteries, or a separate battery system including only one of them. Accordingly, in the present invention, power conversion efficiency can be increased by selecting a battery to provide the input voltage from among the plurality of batteries according to a load condition, thereby increasing the efficiency of an electronic device.

In addition, in the present invention, by using a floating ground, a load having a high input voltage and a low forward voltage can be stably driven. In addition, in the present invention, by controlling the switching element based on a high duty ratio, it is possible to increase the stability of the driving circuit and increase the efficiency at the same time. In addition, in the present invention, it is possible to minimize output noise by using the L-C output filter, and accordingly, the L-C filter in a load requiring a high voltage can be reinforced.

Features, structures, effects, and the like described in the embodiments above are included in at least one embodiment, and are not necessarily limited to only one embodiment. Furthermore, the features, structures, effects, and the like illustrated in each embodiment may be combined or modified for other embodiments by a person having ordinary knowledge in the field to which the embodiments belong. Therefore, contents related to such combinations and modifications should be interpreted as being included in the scope of the embodiments.

Although the embodiments have been described above, these are only examples and are not intended to limit the embodiments, and those of ordinary skill in the field to which the embodiments belong are not departing from the essential characteristics of the embodiments. It will be seen that branch transformation and application are possible. For example, each component specifically shown in the embodiment can be modified and implemented. And differences related to these modifications and applications should be construed as being included in the scope of the embodiments set in the appended claims.

The invention claimed is:

1. A DC-DC converter comprising:
   a first converter configured to output a first output voltage by adjusting a level of an input voltage according to a pulse control signal applied to a first switch element,
   a first light emitter disposed at an output terminal of the first converter;
   a second converter connected to the output terminal of the first converter and configured to output a second output voltage by adjusting a level of the input voltage or the first output voltage according to a pulse control signal applied to a second switch element,
   a second light emitter disposed at an output terminal of the second converter; and
   a controller configured to generate pulse control signals to be applied to the first and second switch elements according to a driving mode of the first and second light emitters and configured to control a switching operation of the first and second switches according to the generated pulse control signals,
   wherein the first output voltage is greater than the input voltage, and the second output voltage is smaller than the first output voltage and the input voltage,
   wherein the driving mode comprises:
   a first driving mode in which both the first and second light emitters are turned on;
   a second driving mode in which the first light emitter is turned on and the second light emitter is turned off, and
   a third driving mode in which the first light emitter is turned off and the second light emitter is turned on.

2. The DC-DC converter of claim 1, further comprising:
   a third switching element disposed between an input terminal of the first converter to which the input voltage is applied and an output terminal of the second light emitter.

3. The DC-DC converter of claim 2, wherein the first converter comprises:
   a first inductor including one terminal to which the input voltage is applied,
   the first switch element having a first terminal connected to the other terminal of the first inductor, a second terminal connected to the output terminal of the first light emitter, and a third terminal connected to the controller,
   a first diode having an anode terminal connected to the other terminal of the inductor and the first terminal of the first switch element, and
   a first capacitor having one terminal connected to a cathode terminal of the first diode.

4. The DC-DC converter of claim 3, wherein the second converter comprises:
   the second switch element having a first terminal connected to the cathode terminal of the first diode and the one terminal of the first capacitor, and a third terminal connected to the controller,
   a second diode having a cathode terminal connected to a second terminal of the second switch element and an anode terminal connected to the other terminal of the first capacitor,
   a second inductor having one terminal connected to a cathode terminal of the second diode and the second terminal of the second switch element, and
   a second capacitor having one terminal connected to the other terminal of the second inductor and the other terminal connected to the anode terminal of the second diode.

5. The DC-DC converter of claim 2, wherein the third switch element operates in a turn-on state and a turn-off state according to periods of the first driving mode, and maintains a turn-off state in the second and third driving modes.

6. A light source driving device comprising:
   a battery part including a first battery supplying a first input voltage and a second battery supplying a second input voltage smaller than the first input voltage;
   a DC-DC converter configured to receive any one of the first and second input voltages from the battery part, output a first output voltage to the first light emitter based on the input voltage according to a driving mode, and output a second output voltage to a second light emitter based on any one of the first output voltage and the input voltage; and
   a switch disposed between the battery part and the DC-DC converter and connecting between the DC-DC converter and any one of the first and second batteries,
   wherein the DC-DC converter comprises:
   a boost converter disposed between the battery part and the first light emitter and configured to boost the applied input voltage according to a switching operation of a first switch element to output the first output voltage; and
   a buck converter disposed between an output terminal of the boost converter and the second light emitter, output the second output voltage by stepping down the applied input voltage or the first output voltage output through the boost converter according to a switching operation of a second switch element,
   a third switching element disposed between an input terminal of the boost converter and an output terminal of the second light emitter, and confirmed to selectively perform a turn-on operation according to the driving mode to connect the output terminal of the second light emitter to the input terminal of the boost converter.

7. The light source driving device of claim 6, wherein the first output voltage is greater than the first and second input voltages, and wherein the second output voltage is less than the first output voltage, the first input voltage, and the second input voltage.

8. The light source driving device of claim 6,
wherein the boost converter comprises:
a first inductor having one terminal connected to the switch to which the first or second input voltage is applied,
the first switch element having a first terminal connected to the other terminal of the first inductor, a second terminal connected to an output terminal of the first light emitter, and a third terminal connected to a controller,
a first diode having an anode terminal connected to the other terminal of the inductor and the first terminal of the first switch element, and
a first capacitor having one terminal connected to a cathode terminal of the first diode, and
wherein the buck converter comprises:
the second switch element having a first terminal connected to the cathode terminal of the first diode and one terminal of the first capacitor, and a third terminal connected to the controller,
a second diode having a cathode terminal connected to a second terminal of the second switch element and an anode terminal connected to the other terminal of the first capacitor,
a second inductor having one terminal connected to the cathode terminal of the second diode and the second terminal of the second switch element.

9. The light source driving device of claim 8, wherein the driving mode comprises:
a first driving mode in which both the first and second light emitters are turned on;
a second driving mode in which the first light emitter is turned on and the second light emitter is turned off, and
a third driving mode in which the first light emitter is turned off and the second light emitter is turned on, and
wherein the third switch element operates in a turn-on state and a turn-off state according to a period of the first driving mode, and maintains a turn-off state in the second and third driving modes,
wherein the switch is configured to connect the first battery and the DC-DC converter in the first and second driving modes, and to connect the second battery and the DC-DC converter in the third driving mode.

10. A DC-DC converter comprising:
a first converter configured to output a first output voltage by adjusting a level of an input voltage according to a pulse control signal applied to a first switch element,
a first light emitter disposed at an output terminal of the first converter;
a second converter connected to the output terminal of the first converter and configured to output a second output voltage by adjusting a level of the input voltage or the first output voltage according to a pulse control signal applied to a second switch element,
a second light emitter disposed at an output terminal of the second converter;

a third switching element disposed between an input terminal of the first converter to which the input voltage is applied and an output terminal of the second light emitter; and
a controller configured to generate pulse control signals to be applied to the first and second switch elements according to a driving mode of the first and second light emitters and configured to control a switching operation of the first and second switches according to the generated pulse control signals,
wherein the first output voltage is greater than the input voltage, and the second output voltage is smaller than the first output voltage and the input voltage.

11. The DC-DC converter of claim 10, wherein the driving mode comprises:
a first driving mode in which both the first and second light emitters are turned on;
a second driving mode in which the first light emitter is turned on and the second light emitter is turned off, and
a third driving mode in which the first light emitter is turned off and the second light emitter is turned on.

12. The DC-DC converter of claim 10, wherein the first converter comprises
a first inductor including one terminal to which the input voltage is applied,
the first switch element having a first terminal connected to the other terminal of the first inductor, a second terminal connected to the output terminal of the first light emitter, and a third terminal connected to the controller,
a first diode having an anode terminal connected to the other terminal of the inductor and the first terminal of the first switch element, and
a first capacitor having one terminal connected to a cathode terminal of the first diode.

13. The DC-DC converter of claim 12, wherein the second converter comprises:
the second switch element having a first terminal connected to the cathode terminal of the first diode and the one terminal of the first capacitor, and a third terminal connected to the controller,
a second diode having a cathode terminal connected to a second terminal of the second switch element and an anode terminal connected to the other terminal of the first capacitor,
a second inductor having one terminal connected to a cathode terminal of the second diode and the second terminal of the second switch element, and
a second capacitor having one terminal connected to the other terminal of the second inductor and the other terminal connected to the anode terminal of the second diode.

14. The DC-DC converter of claim 10, wherein the third switch element operates in a turn-on state and a turn-off state according to periods of the first driving mode, and maintains a turn-off state in the second and third driving modes.

* * * * *